United States Patent
Patino (10) Patent No.: US 9,635,412 B2
(45) Date of Patent: Apr. 25, 2017

(54) SYSTEM AND METHOD FOR PROVIDING A CALLBACK PROXY FOR A SET TOP BOX OF WITH SUPPORT OF ISM-BAND WIDE AREA NETWORK ACCESS

(71) Applicant: The DIRECTV Group, Inc., El Segundo, CA (US)

(72) Inventor: Graciano Patino, Fullerton, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/551,404

(22) Filed: Nov. 24, 2014

(65) Prior Publication Data
US 2016/0150263 A1 May 26, 2016

(51) Int. Cl.
*H04N 21/239* (2011.01)
*H04N 21/418* (2011.01)
(Continued)

(52) U.S. Cl.
CPC ....... *H04N 21/4182* (2013.01); *G06F 21/123* (2013.01); *H04N 7/106* (2013.01); *H04N 7/162* (2013.01); *H04N 7/173* (2013.01); *H04N 7/17309* (2013.01); *H04N 21/2223* (2013.01); *H04N 21/239* (2013.01);
(Continued)

(58) Field of Classification Search
CPC ............... H04N 7/173; H04N 7/17327; H04N 2007/1739; H04N 21/239; H04N 21/2393; H04N 21/437; H04N 21/6181; H04N 21/6156
See application file for complete search history.

(56) References Cited

U.S. PATENT DOCUMENTS 7,773,664 B2* 8/2010 Myers .................... H04B 1/707
375/150
8,181,208 B1* 5/2012 Elwardani ............. H04N 7/104
725/144
(Continued)

FOREIGN PATENT DOCUMENTS

EP 2775728 A1 9/2014

OTHER PUBLICATIONS

Hosek, Jiri et al.; "M2M Gateway: The Centerpiece of Future Home"; 2014 6th International Congress on Ultra Modern Telecommunications and Control Systems and Workshops (ICUMT); IEEE; Oct. 6, 2014 (Oct. 6, 2014); pp. 190-197; XP032716297; DOI: 10.1109/ICUMT.2014.7002101 [retrieved on Jan. 6, 2015]; the whole document.

(Continued)

*Primary Examiner* — Robert Hance
(74) *Attorney, Agent, or Firm* — Fitzgerald & Isaacson, LLP (57) ABSTRACT

A dongle is configured to connect to a set top box. The dongle includes a memory for storing data, such as callback data files, and a wireless communication module for forwarding the stored data to an access point, for delivery to a television service provider head end. The dongle can also receive information to be provided to the set top box. Authentication and authorization of the dongle ensure only authenticated and authorized devices can access the system. A communication technology is used that allows for a large coverage area and simultaneous communication with many set top boxes.

20 Claims, 11 Drawing Sheets

(51) Int. Cl.
- *G06F 21/12* (2013.01)
- *H04N 7/10* (2006.01)
- *H04N 21/4363* (2011.01)
- *H04N 21/222* (2011.01)
- *H04N 7/16* (2011.01)
- *H04N 21/61* (2011.01)
- *H04N 21/437* (2011.01)
- *H04N 21/4185* (2011.01)
- *H04N 7/173* (2011.01)

(52) U.S. Cl.
CPC ..... *H04N 21/2393* (2013.01); *H04N 21/4181* (2013.01); *H04N 21/4184* (2013.01); *H04N 21/4185* (2013.01); *H04N 21/437* (2013.01); *H04N 21/43632* (2013.01); *H04N 21/43637* (2013.01); *H04N 21/6156* (2013.01); *H04N 21/6181* (2013.01); *H04N 2007/1739* (2013.01)

(56) References Cited

U.S. PATENT DOCUMENTS

| | | | | |
|---|---|---|---|---|
| 2003/0140179 | A1* | 7/2003 | Wilt | G06F 9/3851 719/321 |
| 2005/0144635 | A1* | 6/2005 | Boortz | H04N 5/44543 725/32 |
| 2007/0180529 | A1* | 8/2007 | Costea | G06F 21/567 726/24 |
| 2007/0195817 | A1* | 8/2007 | Denney | H04J 3/1682 370/468 |
| 2012/0260297 | A1* | 10/2012 | Candelore | H04N 7/17309 725/110 |
| 2013/0065528 | A1* | 3/2013 | Nagao | H04M 1/72527 455/41.2 |
| 2013/0276047 | A1* | 10/2013 | Chapman | H04N 21/42676 725/111 |
| 2014/0046848 | A1 | 2/2014 | Radu et al. | |

OTHER PUBLICATIONS

Prospero, Michael A.; "How to Set Up Google Chromecast—Step by Step—Tom's Guide"; Jul. 30, 2013 (Jul. 30, 2013); XP55207384; retrieved from the Internet: URL:http://www.tomsguide.com/us/chromecast-how-to, review-1811.html; [retrieved on Aug. 12, 2015]; the whole document.

International Search Report and Written Opinion dated Jan. 7, 2016 in International Application No. PCT/US2015/058882 filed Nov. 3, 2015 by Graciano Patino.

* cited by examiner

SYSTEM AND METHOD FOR PROVIDING A CALLBACK PROXY FOR A SET TOP BOX OF WITH SUPPORT OF ISM-BAND WIDE AREA NETWORK ACCESS

BACKGROUND

Field

Embodiments relate to connecting set top boxes to access points. More particularly, embodiments relate to providing connectivity for set top boxes to Internet access points in areas where there is little or no access to the Internet or telephone service so that callback data can be sent to a television service provider.

Background

Modern television service providers provide service using set top boxes (STBs). As is well known, television signals from terrestrial or extraterrestrial sources are processed by the set top box and transmitted to a television set for presentation of television programming to a viewer. For a number of reasons, television service providers may desire or require information from subscribers or deployed set top boxes. This is often provided using callbacks to send data files containing the information to the television service provider.

A callback allows a set top box to send data to the television service provider in a data file. For example, a set top box may use a pay per view (PPV) callback to send pay per view selections to the television service provider. In response to the PPV callback, the television service provider makes the selected PPV programs available to the subscriber, and bills the subscriber accordingly. In addition, callbacks may be used to send data collected by the set top box to the television service provider. Such information can include data related to viewer purchases such as pay per view selections, data related to audience measurements, such as subscriber viewing preferences, viewing patterns, navigation guide patterns, and the like. In addition, the set top box may collect diagnostic information to determine the health of the set top box, including for example, memory usage, CPU usage and the like.

In general, a callback is transmitted to the television service provider over a data network using, for example, IP or other data network communication protocol. Unfortunately, many areas of the world currently have a low penetration of data network connectivity. One possible solution is to connect the set top box to a telephone network and send data to the television service provider using the telephone system. This too is problematic. In practice, in many parts of the world, only a fraction of deployed set top boxes are connected to a telephone network.

Due to the unavailability of callbacks, television service providers lose revenue, for example, by not being able to get pay per view orders. In such cases, the television service provider must resort to less efficient technologies, such as short messaging service (SMS) or telephone orders. However, such technologies are inconvenient for the subscriber, who may not use them as readily as a simple selection on the set top box, and significantly more costly to the television service provider. The unavailability of callbacks also makes obtaining valuable information that can be used for system monitoring, such as audience viewing patterns and set top box diagnostic information, more difficult, if not impossible.

In general, modern set top boxes provide for callback functionality. That is, modern set top boxes can generate the data files that can be transmitted to the television service provider. However, this callback functionality cannot be exploited in environments that have limited or no access to a data network or the telephone system.

SUMMARY

A dongle is configured to connect to a set top box. The dongle includes a memory for storing data, such as callback data files, and a wireless communication module for forwarding the stored data to an access point, for delivery to a television service provider head end. The dongle can also receive information to be provided to the set top box. Authentication and authorization of the dongle ensures only authenticated and authorized devices can access the system. A communication technology is used that allows for a large coverage area, as well as simultaneous communication with many set top boxes.

In an embodiment, a dongle is connected to a set top box to facilitate communication between the dongle and an access point. The dongle includes a data I/O port comprising a connection to the set top box, a memory to store data transmitted from the set top box through the connection, a processor coupled to the memory, and a wireless communication module to wirelessly transmit the data from the dongle to the access point under control of the processor.

Another embodiment is a method for wirelessly transmitting data from a set top box to an access point using a dongle. The method comprises receiving the data to be transmitted from the set top box through a data I/O port that comprises a connection to the set top box, storing the received data in a memory, and wirelessly transmitting the data from the dongle to the access point under the control of a processor.

DETAILED DESCRIPTION

Figure 1:
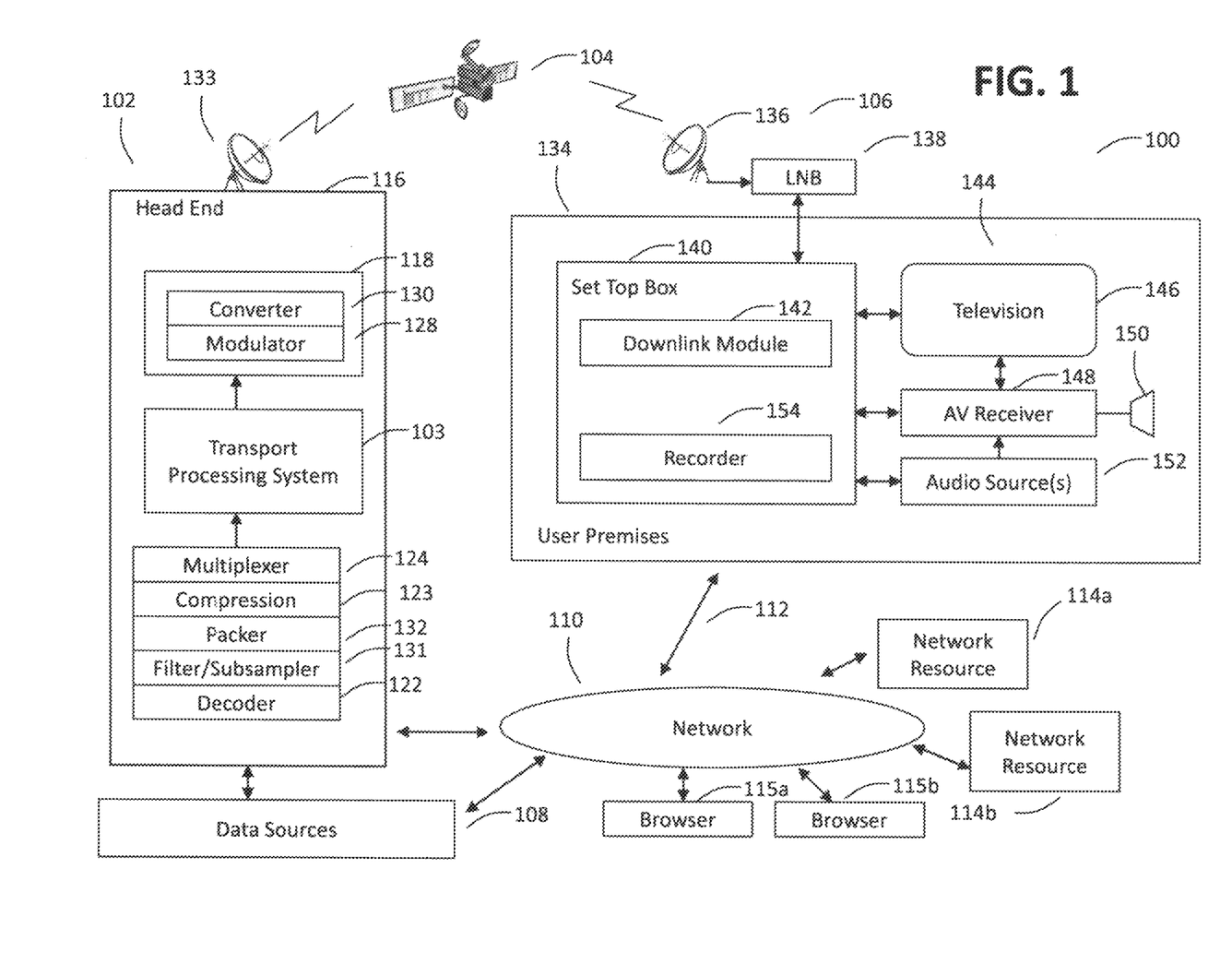
FIG. 1 is a schematic diagram of an exemplary system for providing television services in a television broadcast system, such as a television satellite service provider, according to an embodiment.

FIG. 1 is a schematic diagram of an exemplary system 100 for providing television services in a television broadcast system, such as a television satellite service provider, according to an embodiment. As shown in FIG. 1, exemplary system 100 is an example of a direct-to-home (DTH) transmission and reception system 100. The example DTH system 100 of FIG. 1 generally includes a transmission station 102, a satellite/relay 104, and a plurality of receiver stations, one of which is shown at reference numeral 106, between which wireless communications are exchanged at any suitable frequency (e.g., Ku-band, Ka-band, and reverse band frequencies). As described in detail below with respect to each portion of the system 100, information from one or more of a plurality of data sources 108 is transmitted from transmission station 102 to satellite/relay 104. Satellite/relay 104 may be at least one geosynchronous or geo-stationary satellite. In turn, satellite/relay 104 rebroadcasts the information received from transmission station 102 over broad geographical area(s) including receiver station 106. Exemplary receiver station 106 is also communicatively coupled to transmission station 102 via a network 110. Network 110 can be, for example, the Internet, a local area network (LAN), a wide area network (WAN), a conventional public switched telephone network (PSTN), and/or any other suitable network system or combination thereof. A connection 112 (e.g., a terrestrial link via a telephone line or cable) to network 110 may also be used for supplemental communications (e.g., software updates, subscription information, programming data, information associated with interactive programming, etc.) with transmission station 102 and/or may facilitate other general data transfers between receiver station 106 and one or more network resources 114a and 114b, such as, for example, file servers, web servers, and/or databases (e.g., a library of on-demand programming).

Data sources 108 receive and/or generate video, audio, and/or audiovisual programming including, for example, television programming, movies, sporting events, news, music, pay-per-view programs, advertisement(s), game(s), etc. In the illustrated example, data sources 108 receive programming from, for example, television broadcasting networks, cable networks, advertisers, and/or other content distributors. Further, example data sources 108 may include a source of program guide data that is used to display an interactive program guide (e.g., a grid guide that informs users of particular programs available on particular channels at particular times and information associated therewith) to an audience. Users can manipulate the program guide (e.g., via a remote control) to, for example, select a highlighted program for viewing and/or to activate an interactive feature (e.g., a program information screen, a recording process, a future showing list, etc.) associated with an entry of the program guide. Further, example data sources 108 include a source of on-demand programming to facilitate an on-demand service.

An example head-end 116 includes a decoder 122, a filter/subsampler 131, a packer 132, a compression system 123, a transport processing system (TPS) 103 and an uplink module 118. In an embodiment, decoder 122 decodes the information by for example, converting the information into data streams. In an embodiment, filter/subsampler 131 provides filtering and subsampling as described herein. In an embodiment, the data is received in a subsampled format, and filter/subsampler 131 is not applied. In an embodiment, packer 132 packs 3D data into a 2D compatible format. In an embodiment, compression system 123 compresses the bit streams into a format for transmission, for example, MPEG-2 or MPEG-4. In some cases, AC-3 audio is not decoded, but passed directly through without first decoding. In such cases, only the video portion of the source data is decoded.

In an embodiment, multiplexer 124 multiplexes the data streams generated by compression system 123 into a transport stream so that, for example, different channels are multiplexed into one transport. Further, in some cases a header is attached to each data packet within the packetized data stream to facilitate identification of the contents of the data packet. In other cases, the data may be received already transport packetized.

TPS 103 receives the multiplexed data from multiplexer 124 and prepares the same for submission to uplink module 118. In an embodiment, TPS 103 includes loudness control for audio data received from data sources 108, metadata insertion to associate content with certain information such as, for example, identifying information related to media content and/or instructions and/or parameters specifically dedicated to an operation of one or more audio loudness operations. In an embodiment, TPS 103 further encrypts the data packet(s) using any suitable technique capable of protecting the data packet(s) from unauthorized entities.

Uplink module 118 prepares the data for transmission to satellite/relay 104. In an embodiment, uplink module 118 includes a modulator 128 and a converter 130. During operation, encrypted data packet(s) are conveyed to modulator 128, which modulates a carrier wave with the encoded information. The modulated carrier wave is conveyed to converter 130, which, in the illustrated example, is an uplink frequency converter that converts the modulated, encoded bit stream to a frequency band suitable for reception by satellite/relay 104. The modulated, encoded bit stream is then routed from uplink frequency converter 130 to an uplink antenna 133 where it is conveyed to satellite/relay 104.

Satellite/relay 104 receives the modulated, encoded bit stream from the transmission station 102 and broadcasts it downward toward an area on earth including receiver station 106. Example receiver station 106 is located at a subscriber premises 134 having a reception antenna 136 installed thereon that is coupled to a low-noise-block downconverter (LNB) 138. LNB 138 amplifies and, in some embodiments, downconverts the received bitstream. In the illustrated example of FIG. 1, LNB 138 is coupled to a set-top box 140. While the example of FIG. 1 includes a set-top box, the example methods, apparatus, systems, and/or articles of manufacture described herein can be implemented on and/or in conjunction with other devices such as, for example, a personal computer having a receiver card installed therein to enable the personal computer to receive the media signals described herein, and/or any other suitable device. Additionally, the set-top box functionality can be built into an A/V receiver 148 or a television 146.

Example set-top box 140 receives the signals originating at head-end 116 and includes a downlink module 142 to process the bitstream included in the received signals. Example downlink module 142 demodulates, decrypts, demultiplexes, decodes, and/or otherwise processes the bitstream such that the content (e.g., audiovisual content) represented by the bitstream can be presented on a display device of, for example, a media presentation system 144. Example media presentation system 144 includes a television 146, an AV receiver 148 coupled to a sound system 150, and one or more audio sources 152. As shown in FIG. 1, set-top box 140 may route signals directly to television 146 and/or via AV receiver 148. In an embodiment, AV receiver 148 is capable of controlling sound system 150, which can be used in conjunction with, or in lieu of, the audio components of television 146. In an embodiment, set-top box 140 is responsive to user inputs to, for example, to tune a particular channel of the received data stream, thereby displaying the particular channel on television 146 and/or playing an audio stream of the particular channel (e.g., a channel dedicated to a particular genre of music) using the sound system 150 and/or the audio components of television 146. In an embodiment, audio source(s) 152 include additional or alternative sources of audio information such as, for example, an MP3 player (e.g., an Apple® iPod®), a Blu-eray® player, a Digital Versatile Disc (DVD) player, a compact disc (CD) player, a personal computer, etc.

Further, in an embodiment, example set-top box 140 includes a recorder 154. In an embodiment, recorder 154 is capable of recording information on a storage device such as, for example, analog media (e.g., video tape), computer readable digital media (e.g., a hard disk drive, a digital versatile disc (DVD), a compact disc (CD), flash memory, etc.), and/or any other suitable storage device.

Figure 2:
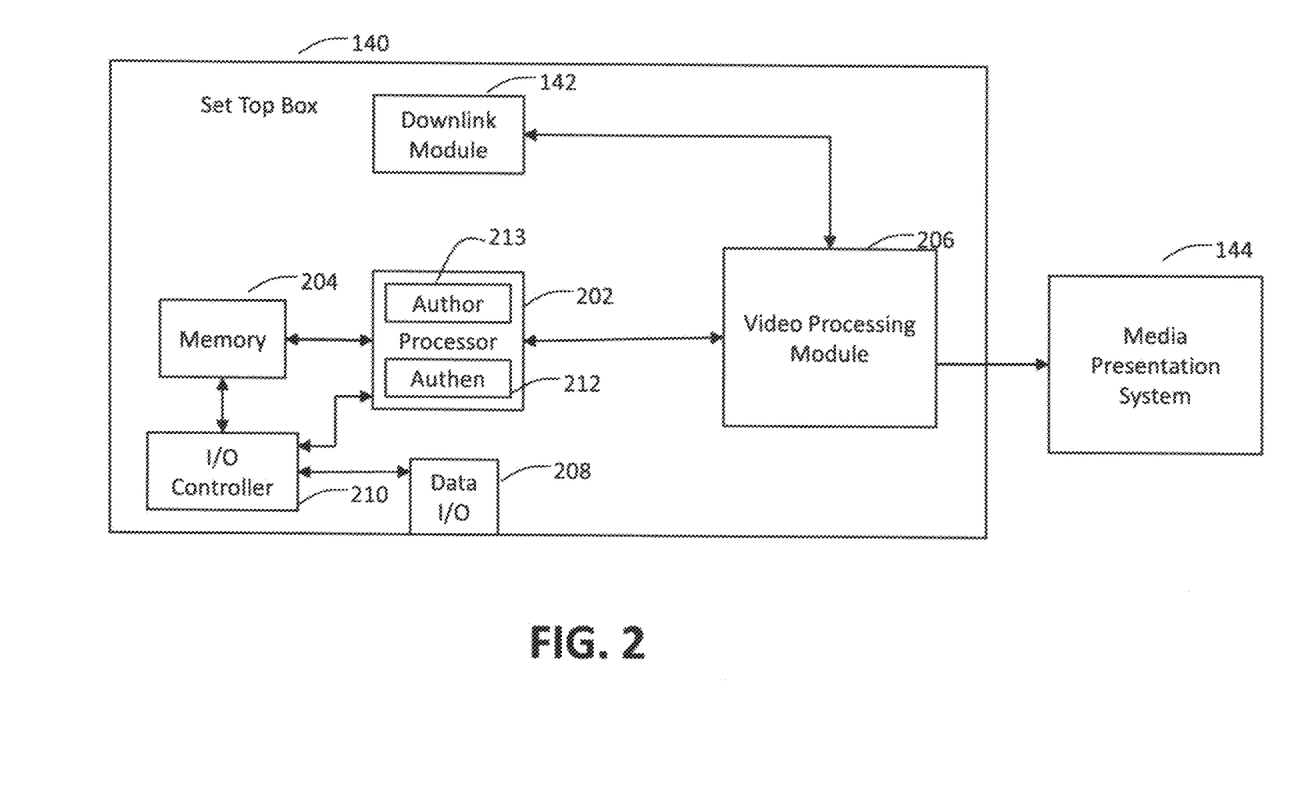
FIG. 2 is a simplified schematic diagram of an exemplary set top box according to an embodiment.

FIG. 2 is a simplified schematic diagram of an exemplary set top box (STB) 140 according to an embodiment. Such a set top box can be, for example, in the DIRECTV HR2x family of set top boxes. As shown in FIG. 2, STB 140 includes a downlink module 142 described above.

A processor 202 controls operation of STB 140. Processor 202 can be any processor that can be configured to perform the operations described herein for processor 202. Processor 202 has accessible to it a memory 204. Memory 204 can be used as storage space for recorder 154 (described above). Further, memory 204 can be used to store programs to be run by processor 202 as well as used by processor 202 for other functions necessary for the operation of STB 140 as well as the functions described herein. In alternate embodiments, one or more additional memories may be implemented in STB 140 to perform one or more of the foregoing memory functions. A video processing module 206 performs processing on data received from downlink module 142 and processor 202 to form video to be displayed on media presentation system 144.

In an embodiment, STB 140 includes a data input/output (I/O) port 208 through which data can be input to or output from STB 140. In an embodiment, for example, data I/O port 208 is a universal serial bus (USB) port. In an embodiment, data is input to or output from STB 140 under control of I/O controller 210. In an embodiment, I/O controller 210 inputs data to or outputs data from memory 204 using direct memory access (DMA).

In an embodiment, processor 202 includes an authentication module 212. Authentication module 212 is used to authenticate a device coupled to STB 140 through data I/O port 208. In an embodiment, such authentication is performed using a handshaking operation as described more fully below.

In an embodiment, processor 202 includes an authorization module 213. Authorization module 213 is used to authorize a device coupled to STB 140 through data I/O port 208. In an embodiment, such authorization is performed using a handshaking operation as described more fully below.

Figure 3:
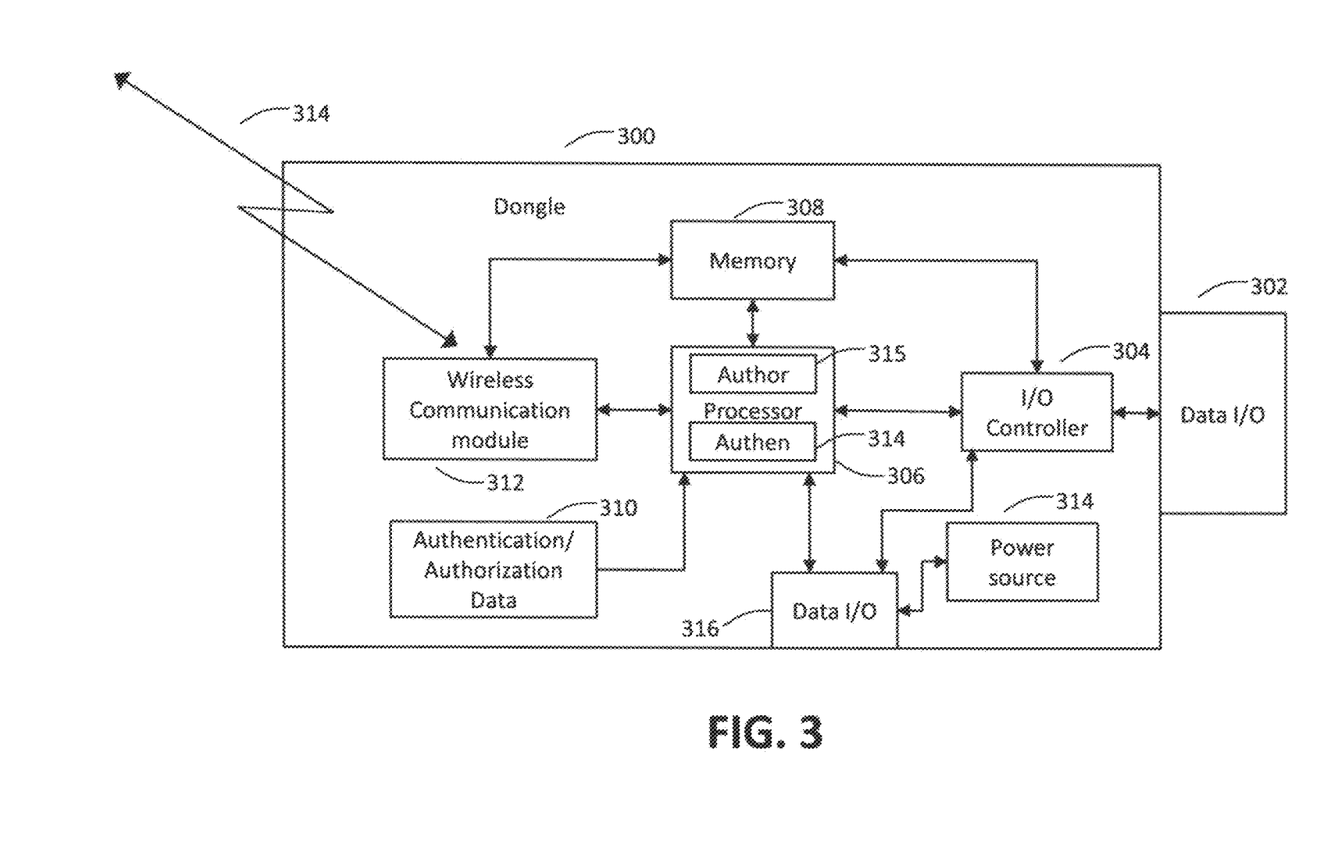
FIG. 3 is a schematic diagram of a dongle according to an embodiment.

FIG. 3 is a schematic diagram of a dongle 300 according to an embodiment. Dongle 300 includes a data I/O connector 302 and a data I/O controller 304. In an embodiment, data I/O connector 302 and data I/O controller are a USB connector and a USB controller respectively. Data can be input to, or output from, dongle 300 through data I/O port 302 under control of data I/O controller 304. In an embodiment, for example, data is input to, or output from, dongle 300 using DMA techniques to or from a memory 308. In an embodiment, dongle 300 is coupled to STB 140 through data I/O port 208 of STB 140.

Dongle 300 is controlled generally by processor 306. In an embodiment, processor 306 includes an authentication module 314 that is used to authenticate dongle 300. For example, in an embodiment, authentication is performed using a handshaking operation described more fully below. In an embodiment, data required for authentication is stored in a non-volatile memory 310. In an embodiment, authentication data stored in non-volatile memory 310 is stored when dongle 300 is manufactured. In an embodiment, the stored authentication data is an authentication code.

In an embodiment, processor 306 includes an authorization module 315 that is used to authorize dongle 300. For example, in an embodiment, authorization is performed using a handshaking operation described more fully below. In an embodiment, data required for authorization is stored in a non-volatile memory 310. In an embodiment, authorization data stored in non-volatile memory 310 is stored when dongle 300 is manufactured. In an embodiment, the stored authorization data is an authorization code. In an embodiment, authentication and authorization are performed automatically when dongle 300 is inserted into data I/O port 208 of STB 140.

A wireless communication module 312 allows data to be transmitted wirelessly from dongle 300. Wireless communication module 312 can conform to one or more wireless communication technologies. In an embodiment, communication is bi-directional such that data can be transmitted from wireless communication module 312 or transmitted to wireless communication module 312 for storage in memory 308. In an embodiment, wireless communication module 312 stores data in and/or obtains data from memory 308 using DMA techniques. In an embodiment, callback data is stored in memory 308, and forwarded by wireless communication module 312. In an embodiment, callback data files are transmitted by wireless communication module 312 without first being stored in memory 308.

Any wireless communication technology can be used to transmit callback data files from the dongle to the access point. Preferably, a low power communication technology that provides a wide coverage area and can handle a large number of simultaneous communications is used. One such communication technology is random phase multiple access (RPMA). RPMA can provide coverage for up to 400 square miles for a single access point, and can reach below ground receivers in distances for up to a mile. Using a high capacity access point, RPMA can handle thousands of simultaneous radio communications per high capacity access point. In addition, preferably ISM bands, such as the 2.4 GHz band, are used. ISM bands are chosen because they are license-free worldwide. Wireless mesh technologies can also be used in the ISM bands. However, they would require a large number of repeaters to obtain similar performance in terms of coverage area as compared to RPMA.

RPMA assigns a unique code that generates a randomly created delay that is unique to each dongle. As such, each dongle (and its corresponding set top box) can be identified based on the unique randomly generated delay. In addition, RPMA provides high capacity with a large coverage area. Moreover, a single access point can communicate simultaneously with a large number of radios (dongles) simultaneously. This is advantageous in city environments where a single access point can communicate with, for example, all of the dongles in a multiple dwelling unit (MDU), such as an apartment building, or complex of MDUs. More information concerning RPMA can be found in U.S. Pat. No. 7,773,664, which is hereby incorporated by reference in its entirety.

Dongle 300 acts as a proxy for STB 140 to send data files containing callback data, such that STB 140 effectively sees dongle 300 as a callback server that it would otherwise send callback data but for STB 140 not having access to the required data networks or telephone lines. In operation, STB 140 prepares callback data files as it normally would. However, rather than transmit the callback data files over a network, STB 140 transmits the callback data files to dongle 300 to be stored in memory 308. Dongle 300 then is responsible for transmitting the callback data files to the television service provider. It does so using wireless communication module 312 over a wireless communication channel 314. For example, the callback data can be sent to a television service provider by accessing an access point connected to a data network, such as the Internet, so that the data can be forwarded to the television service provider.

In this manner, STB 140 can transmit callback data files to dongle 300 as if it were connected directly to a data network, that is, with little or no latency. As such, STB 140 effectively sees dongle 300 as data network proxy to which it can transmit callback data files, i.e., dongle 300 acts as a callback proxy for STB 140. As a result, dongle 300 allows STB 140 to use legacy callback functionality without having to redesign STB 140 to provide callback functionality in areas where there is limited data network availability and limited telephone network availability.

In an embodiment, STB 140 can transmit all or part of a callback data file to the dongle in a particular transaction. In DMA applications, this may be important to avoid controlling the bus for long periods for large callback data files. In such cases, callback data files can be transmitted in multiple subfiles. In an alternate embodiment, separate data paths are used for the callback data files and other set top box operations.

Figure 4:
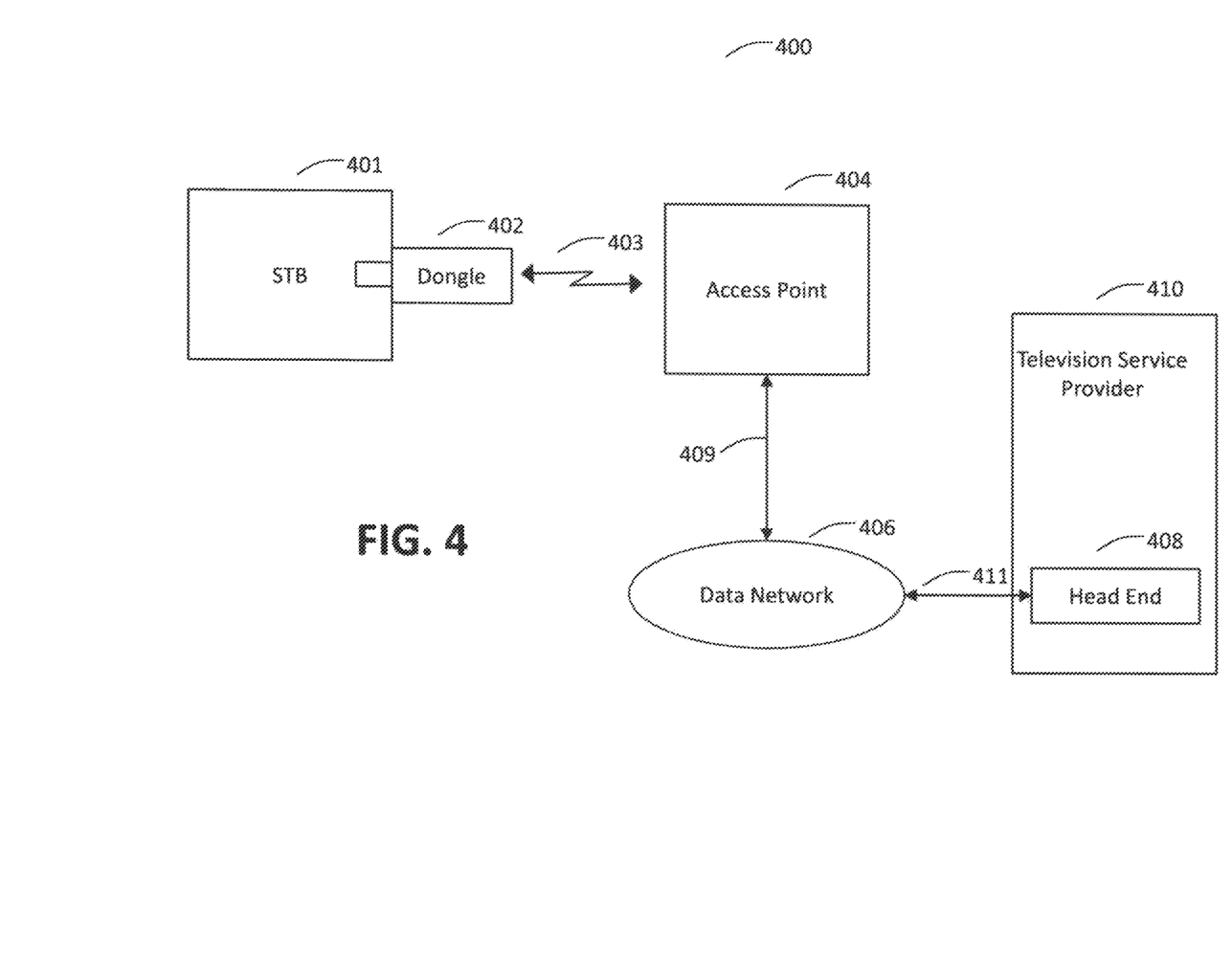
FIG. 4 is a schematic diagram of a system using a dongle as a proxy to provide callback information to a television service provider according to an embodiment.

FIG. 4 is a schematic diagram of a system 400 using a dongle as a proxy to provide callback information to a television service provider. A set top box 401 (such as set top box 140) has attached thereto a dongle 402 (such as dongle 300) according to an embodiment. Set top box 401 generates callback data and formats it into a callback data file. The callback data file is transmitted to dongle 402. Dongle 402 transmits the callback data file over a wireless communication channel 403 to access point 404. Access point 404 is coupled to a data network 406 by a communication channel 409. Data network can be any network that can carry data including an intranet, Internet, wide area network, local area network, etc. Communication channel 409 can be a wireless and/or wired communication channel. Data network 406 is coupled to a head end 408 of a television service provider 410 via a communication channel 411. Communication channel 411 can be a wireless and/or wired communication channel. Access point 404 causes the callback data file to be transmitted to head end 408 of television service provider 410 through data network 406 over communication channels 409 and 411, where it can then be processed as desired by television service provider 410.

This configuration also addresses another issue. Oftentimes, there are large latency times associated with communicating with access points, which often result in connection timeouts. These latencies are incurred due to wide area network communications designed for low throughput machine-to-machine communications. To STB 140, however, dongle 300 looks like a callback server. Therefore, dongle 300 significantly reduces any communication latency. Once the callback data file is on dongle 300, latency is no longer an issue as the dongle has time to communicate with the access point, that is, dongle 300 can act as a store and forward buffer for the callback data file.

Figure 5A:
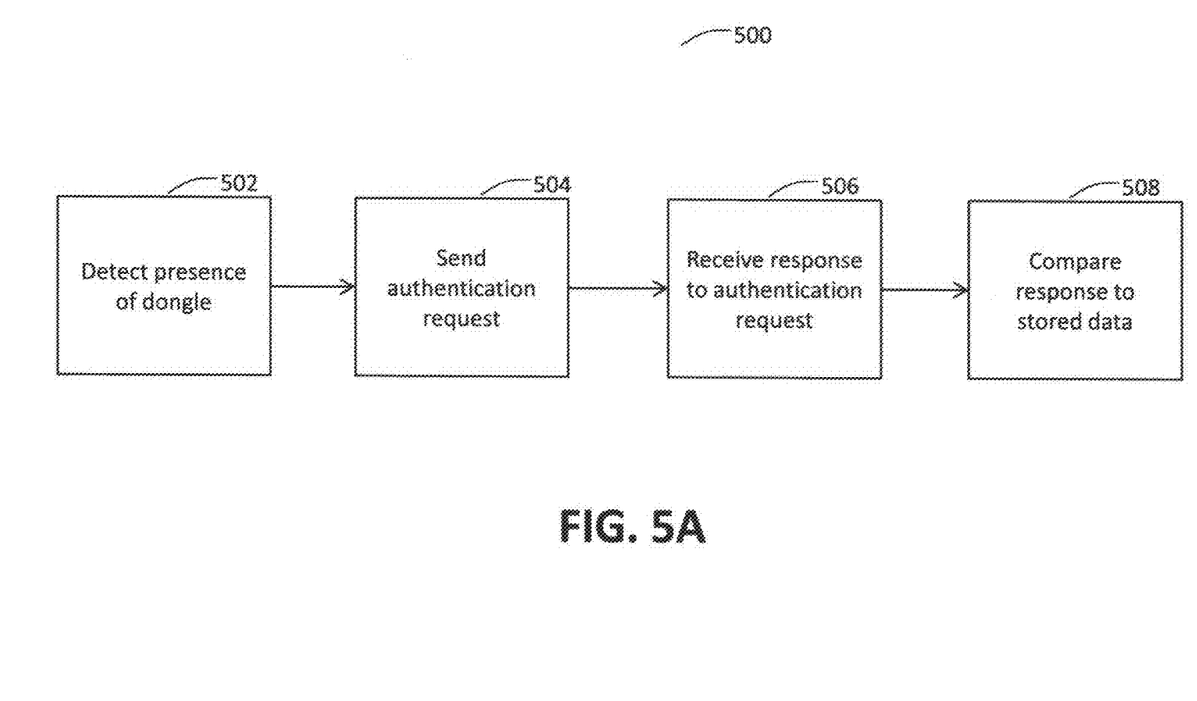
FIG. 5A is a flow diagram of a method for authenticating a dongle according to an embodiment.

As referenced above, a dongle according to an embodiment can be authenticated. This is important for the safety of the set top box to which the dongle is connected and the safety of the data network through which the dongle sends data, and the televisions service provider head end that ultimately receives the data. FIG. 5A is a flow chart 500 for authenticating a dongle according to an embodiment. In step 502, the set top box detects the presence of an attached dongle. In an embodiment, this is accomplished by detecting a signal asserted by the dongle. In step 504, the set top box sends an authentication request. In step 506, the set top box receives a response to the authentication request. In an embodiment, the response is a unique authentication code for the dongle. In step 508, the set top box compares the received response to ensure that the dongle is authentic. In an embodiment, the set top box has stored therein an authentication code that is compared to the data received in response to the authentication request. The dongle is considered authentic if the data received in response to the authentication request matches the authentication data stored in the set top box. Where authentication is data network authentication, the authorization can be performed by any node on the computer network configured to perform such authentication, for example, the access point or a server in the television service provider head end.

Figure 5B:
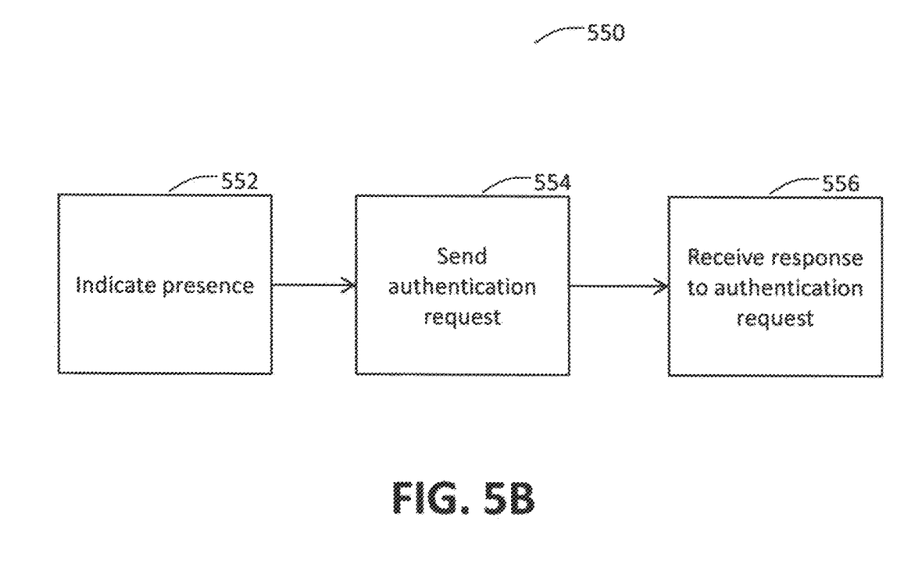
FIG. 5B is a flow diagram of a method for handling authentication by the dongle according to an embodiment.

FIG. 5B is a flow chart 550 for handling authentication by the dongle, for example, by processor 306 in dongle 300. In step 552, the dongle indicates its presence. In an embodiment, this is accomplished by the dongle asserting a signal on a dedicated or assigned connection, for example, in data I/O port 302 that the set top box can detect, for example, with I/O controller 210, or by sending a message that a node in the data network, for example, access point 404 or a service in head end 408, can process. In step 554, the dongle receives an authentication request. In step 556, the dongle responds to the authentication request. In an embodiment, for example, the response is to send a unique authentication code corresponding to the dongle that is stored in the dongle in response to the authentication request. In an embodiment, the authentication code is stored in the dongle during manufacture of the dongle.

Figure 6A:
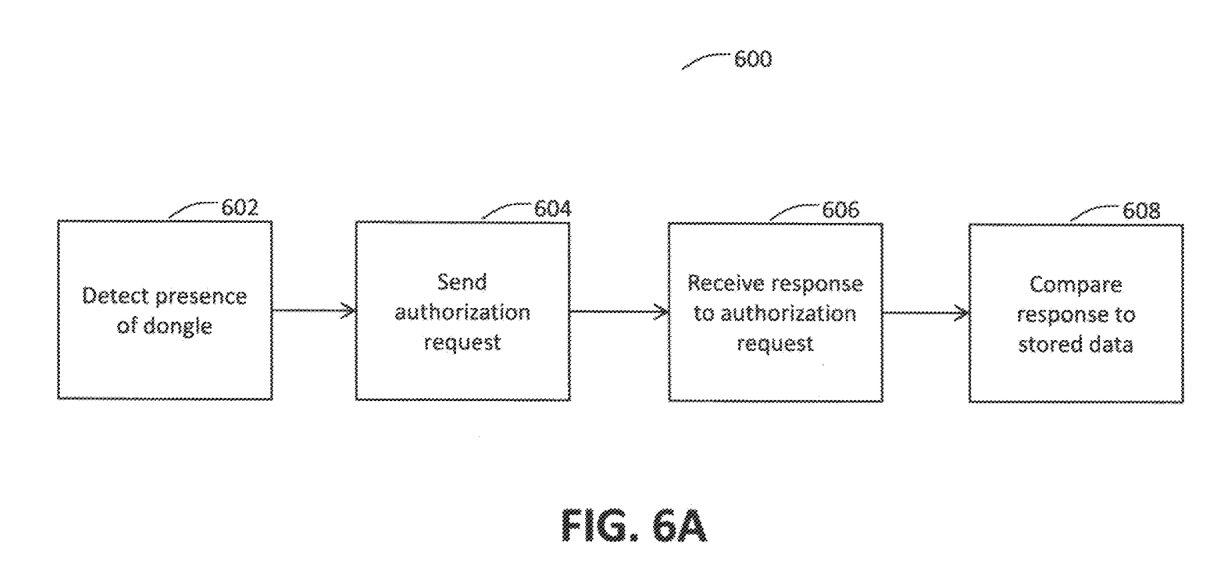
FIG. 6A is a flow diagram of a method for determining whether a dongle is authorized according to an embodiment.

An authentic dongle may not be authorized for a particular set top box. In an embodiment, a dongle is authorized in an analogous manner to authentication. FIG. 6A is a flow chart 600 for determining whether a dongle is authorized according to an embodiment. In step 602, the set top box detects the presence of an attached dongle. In an embodiment, this is accomplished by detecting a signal asserted by the dongle. In step 604, the set top box sends an authorization request. In step 606, the set top box receives a response to the authorization request. In an embodiment, the response is a unique authorization code for the dongle. In step 608, the set top box compares the received response to ensure that the dongle is authorized. In an embodiment, the set top box has stored therein an authorization code that is compared to the data received in response to the authorization request. The dongle is considered authorized where the data received in response to the authorization request matches the authorization data stored in the set top box. Where authorization is data network authorization, the authorization can be performed by any node on the computer network configured to perform such authorization, for example, the access point or a server in the television service provider head end.

Figure 6B:
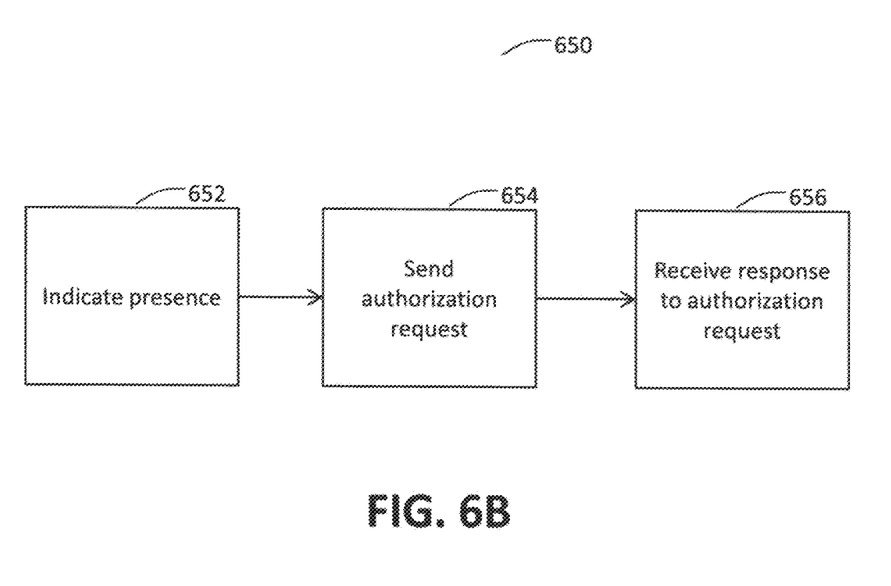
FIG. 6B is a flow diagram of a method for handling authorization by the dongle according to an embodiment.

FIG. 6B is a flow chart 650 for handling authorization by the dongle, for example, by processor 306 in dongle 300. In step 652, the dongle indicates its presence. In an embodiment, this is accomplished by the dongle asserting a signal on a dedicated or assigned connection, for example, on data I/O port 302 that the set top box can detect, for example, with I/O controller 210, or by sending a message that a node in the data network, for example, access point 404 or a service in head end 408, can process. In step 654, the dongle receives an authorization request. In step 656, the dongle responds to the authorization request. In an embodiment, for example, the response is to send a unique authorization code corresponding to the dongle that is stored in the dongle in response to the authorization request. In an embodiment, the authorization code is stored in the dongle during manufacture of the dongle.

Figure 7:
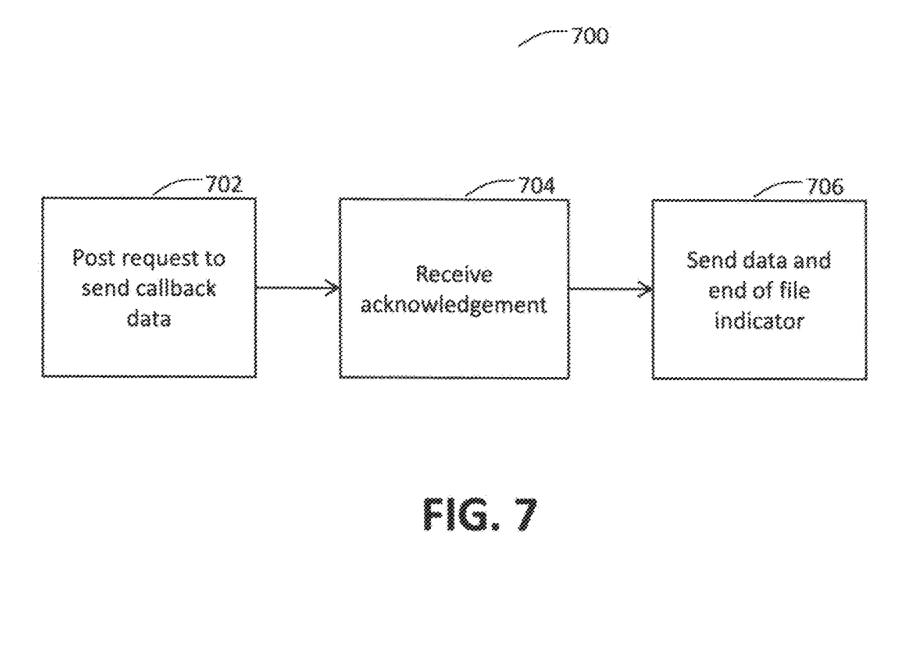
FIG. 7 is a flow diagram of a method for the dongle requesting to send callback data to the data network for example to the access point according to an embodiment.

FIG. 7 is a flow chart 700 for the dongle requesting to send callback data to the data network for example to the access point. In step 702, the dongle posts a request to send callback data, for example, to the access point. Such a request, can be by setting a callback send request signal. In step 704, the dongle receives acknowledgment of the request, for example, by detecting resetting of the callback request signal, or setting of an acknowledgement signal. In response to the received acknowledgement, the dongle begins wireless transmission of the data to the access point, and concludes with an end of file indicator.

Referring back to FIG. 3, in an embodiment, dongle 300 includes a power source 314 and a second data I/O port 316. This allows an additional device to be connected to dongle 300 through data I/O port 316, and allows for such additional device to be powered by power source 314. In an embodiment, data I/O is controlled by I/O controller 304. If desired, a second I/O controller (not shown) can be added to control data I/O through second data I/O port 316. This allows cascading of devices using dongle 300, which is useful on set top boxes with only one USB port.

Figure 8:
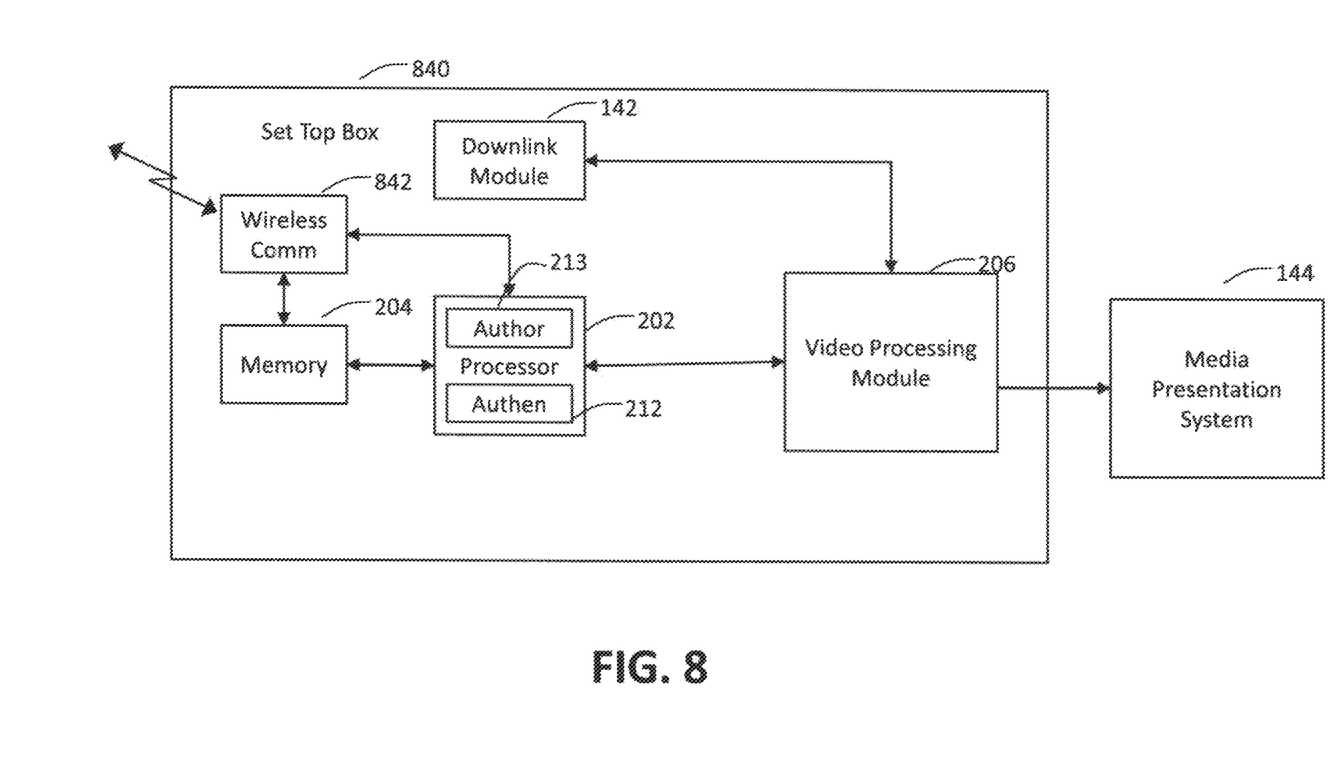
FIG. 8 is a schematic diagram of a set top box in which a wireless communication module is incorporated according to an embodiment.

FIG. 8 illustrates an alternate embodiment for the set top box and dongle. FIG. 8 is a schematic diagram of a set top box 840 in which a wireless communication module 842 is incorporated in set top box 840. Items in FIG. 8 having like numbers to those in FIG. 2 have substantially the same functionality as described above with respect to FIG. 2. Wireless communication module 842 has substantially the same functionality as described above with respect to wireless communication module 312 described above with reference to FIG. 3. In the embodiment of FIG. 8, STB 840 would not require I/O controller 210 or data I/O port 208 as far as a dongle is concerned.

In an embodiment, the dongle is used to send data to the set to box in addition to receiving data therefrom. One use of data being sent to the set top box is to provide on-screen surveys for subscribers to complete. Such surveys may only be a few questions long. The responses would be packaged in a callback data file and sent to the television service provider as described above.

Figure 9:
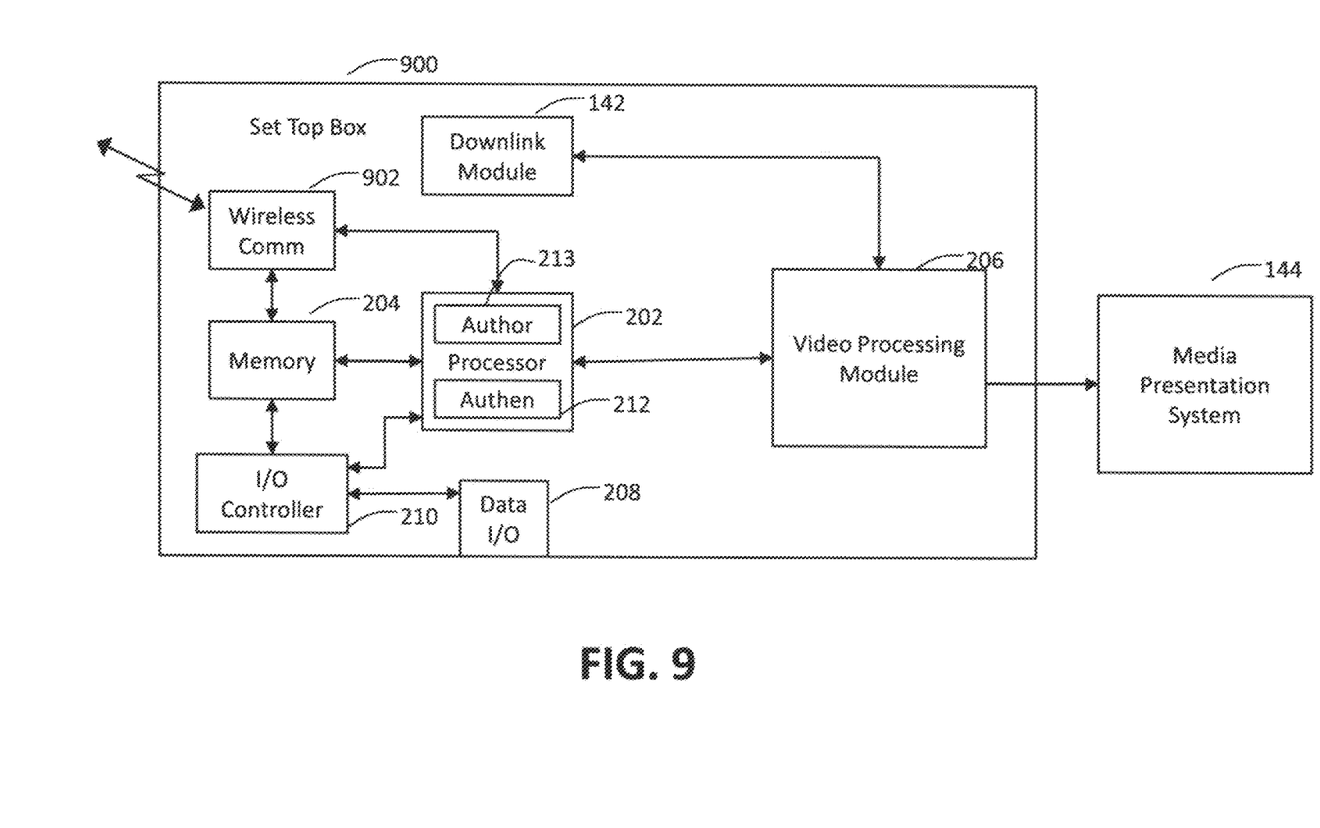
FIG. 9 illustrates a set top box for use in home automation applications to control home security systems and/or appliances and other devices in the home.

Another application for such bilateral data communication with a set top box is home automation, for example, controlling home security systems and home automation devices. FIG. 9 illustrates a set top box 900 for use in home automation applications to control home security systems and/or appliances and other devices in the home. STB 900 is similar to STB 140 and like numbered items in FIG. 9 have substantially the same functionality as those in FIG. 2. In addition, STB 900 includes a wireless communication module 902. Wireless communication module 902 communicates with the various devices in the home being controlled by STB 900.

Wireless communication module 902 can comply with any appropriate communication technology that can be used to control home devices. For example, in an embodiment, the communication protocol complies with the Zigbee and/or Z-Wave communication standards.

In operation, one or more configuration files are uploaded to STB 900 through dongle 300 that has been coupled to STB 900. The configuration file(s) contain data that is used to configure home security and/or home automation devices. STB 900 is configured to receive the configuration file(s) and then transmit the data to the home security or home automation devices through wireless communication module 902 to configure them for operation. In addition, STB 900 can receive data from home automation/home security devices to be transmitted to the head end using dongle 300. In this way, STB 900 acts as a master for home security and/or home automation devices.

An application running on STB 900 can be used to provide a user interface to users to control home security and/or home automation devices. In an embodiment, the user interface provides options, for example, in the form of navigable menus, to the user to allow control of home security and/or home automation devices. After the user has selected desired options, a new configuration file (or files) is (are) created and sent to STB 900. STB 900 processes the received configuration files(s) and transmits configuration data to the home security and/or home automation devices as appropriate to update their operation.

In an embodiment, rather than reconfigure STB 140 to include Zigbee and/or Z-Wave communications functionality, a communication module is made to have the capability. In such embodiment, the module can be connected to dongle 300 through data I/O port 316 through which data received by the communication module is provided to dongle 300 to be provided to STB 140. Alternatively the communication module can be coupled directly to STB 140 through data I/O port 208. STB 140 would still require software to process the data and send it back to the communication module through dongle 300 for transmission to home security and/or home automation devices.

In another embodiment, either dongle 300 or STB 140 is configured with a plug to allow USNAP compliant devices to be coupled to the dongle or STB. USNAP is a standard that allows plugable modules using a common interface design. In this manner, home security and/or home automation devices that adhere to the USNAP common interface standard can be coupled to dongle 300 or STB 140, and thereby controlled by dongle 300 or STB 140.

In an alternate embodiment, home security and/or home automation devices are configured with RPMA compliant communications capability. In such instances dongle 300 could act as a relay for communications between the home security and/or home automation devices and STB 140, and as such be used for control without the requirement for addition control communication technologies such as Zigbee, Z-Wave or USNAP.

The foregoing disclosure of the preferred embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, claims directed to a method and/or process should not be limited to the performance of their steps in the order written, and one skilled in the art can readily appreciate that the sequences may be varied and still remain within the spirit and scope of the present invention.

What is claimed is:

1. A dongle to be connected to a set top box to provide a callback proxy, comprising:
    a data I/O port comprising a connection to the set top box;
    a memory to store at least a portion of a data file transmitted from the set top box through the connection, wherein the dongle is configured to allow the set top box to use legacy functionality, and wherein the dongle is configured to emulate a callback server to provide the callback proxy;
    a processor coupled to the memory; and
    a wireless communication module under control of the processor to wirelessly transmit the data file from the dongle to an access point.

2. The dongle of claim 1, wherein the dongle is configured to transmit the at least a portion of the data file after a randomly created delay that is unique to the dongle.

3. The dongle of claim 1, wherein the connection is a USB connection.

4. The dongle of claim 1, further comprising a first data I/O controller to process the data of the at least a portion of the data file received through the data I/O port to be stored into the memory.

5. The dongle of claim 1, wherein the memory further stores authentication data to be used to authenticate the dongle, wherein the processor is configured to authenticate the dongle using the authentication data.

6. The dongle of claim 1, wherein the memory further stores authorization data to be used to authorize the dongle, wherein the processor is configured to authorize the dongle using the authorization data.

7. The dongle of claim 1, further comprising:
    a power source; and
    a second data I/O port through which power is supplied by the power source when a device is connected to the first data I/O port.

8. The dongle of claim 7, further comprising a second data I/O controller to process data received through the second data I/O port to be stored in the memory.

9. The dongle of claim 1, wherein the wireless communication module is configured to wirelessly transmit data using a communication technology that provides a wide coverage area and can handle a large number of simultaneous communications.

10. The dongle of claim 1, wherein the set top box is configured to transmit the at least a portion of the data file in multiple parts as subfiles to the dongle.

11. A method for wirelessly transmitting a data file from a set top box to an access point using a dongle, comprising:
    configuring the dongle to emulate a callback server to provide a callback proxy for the set top box;
    receiving, at the dongle, through a data I/O port that comprises a connection to the set top box, at least a portion of the data file to be transmitted from the set top box;
    storing the received at least a portion of the data file in a memory;
    wirelessly transmitting the stored at least a portion of the data file from the dongle to the access point under the control of a processor.

12. The method of claim 11, further comprising transmitting the at least a portion of the data file after a randomly created delay that is unique to the dongle.

13. The method of claim 11, wherein the connection is a USB connection.

14. The method of claim 11, further comprising processing data from the at least a portion of the data file received through the data I/O port to be stored into the memory using a first data I/O controller.

15. The method of claim 11, further comprising:
    storing authentication data; and
    configuring the processor to authenticate the dongle using the authentication data.

16. The method of claim 11, further comprising:
    storing authorization data; and
    configuring the processor to authorize the dongle using the authorization data.

17. The method of claim 11, further comprising:
    connecting the dongle to a device through a second data I/O port under the control of a second data I/O controller; and
    supplying power to the connected device using a power supply.

18. The method of claim 17, further comprising:
    receiving data through the second data I/O port; and
    processing the received data for storage in the memory.

19. The method of claim 11, further comprising wirelessly transmitting the data using a communication technology that provides a wide coverage area and can handle a large number of simultaneous communications.

20. The method of claim 11, further comprising transmitting the at least a portion of the data file in multiple parts as subfiles to the dongle.

* * * * *

UNITED STATES PATENT AND TRADEMARK OFFICE
CERTIFICATE OF CORRECTION

PATENT NO. : 9,635,412 B2  
APPLICATION NO. : 14/551404  
DATED : April 25, 2017  
INVENTOR(S) : Graciano Patino Page 1 of 1

It is certified that error appears in the above-identified patent and that said Letters Patent is hereby corrected as shown below:

On the Title Page

The Title, reading:
"SYSTEM AND METHOD FOR PROVIDING A CALLBACK PROXY FOR A SET TOP BOX OF WITH SUPPORT OF ISM-BAND WIDE AREA NETWORK ACCESS"
Should read as follows:
-- SYSTEM AND METHOD FOR PROVIDING A CALLBACK PROXY FOR A SET TOP BOX WITH SUPPORT OF ISM-BAND WIDE AREA NETWORK ACCESS --

Signed and Sealed this
Eighth Day of August, 2017

Joseph Matal
*Performing the Functions and Duties of the*
*Under Secretary of Commerce for Intellectual Property and*
*Director of the United States Patent and Trademark Office*